Sept. 7, 1954  H. S. HOFFAR  2,688,718
MOTOR REVERSING SWITCH AND SYSTEM
Filed Oct. 30, 1950
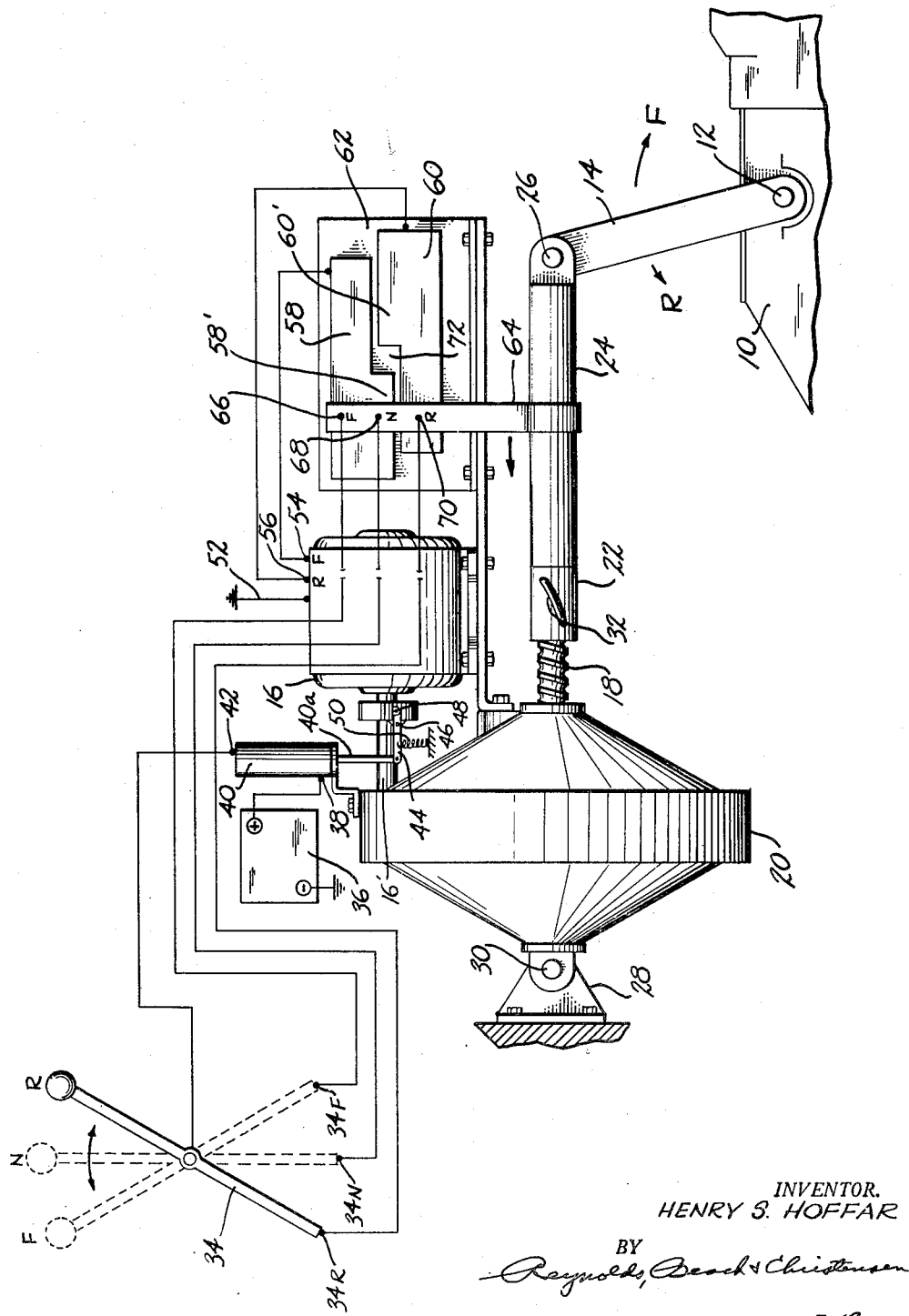
INVENTOR.
HENRY S. HOFFAR
BY
Reynolds, Beach & Christensen
ATTORNEYS Patented Sept. 7, 1954

2,688,718

UNITED STATES PATENT OFFICE 2,688,718

MOTOR REVERSING SWITCH AND SYSTEM

Henry S. Hoffar, Sidney, British Columbia, Canada, assignor to The Cleveland Pneumatic Tool Company, Cleveland, Ohio, a corporation of Ohio Application October 30, 1950, Serial No. 192,930

4 Claims. (Cl. 318—267)

This invention relates to shift controlling apparatus and more particularly to an improved gear shift electrical control system in which the source of motive power operating the gear shift mechanism may be controlled from a remote point. The invention is intended primarily for application to gear shifts for reversible drive transmissions employed in boat or other engines and is herein illustratively described in that preferred setting, but it will be appreciated that certain features present in the invention may find useful application elsewhere.

A general object of the invention is to provide a reliable, compact and positive-acting gear shift control apparatus for boat engine reversible drive transmissions or the like, involving a control arrangement permitting the locally stationed motive power source operating the gear shift mechanism to be controlled electrically from a remote station, such as the boat's bridge, whereas the bulkier mechanical parts are located in the engine hold where space is not the serious problem that it is in the pilot's bridge or similar location convenient for the master control.

Another object of the invention is an electrically operated gear shift control apparatus employing a simple and compactly arranged limit switch mechanism, as part of a follow-up control, which in conjunction with a remote control master switch effects energization of the drive motor to turn in the correct sense automatically until the same has positioned the gear shift lever at the desired position, represented by the forward, neutral or reverse gear setting of such lever, selected by the master control switch.

Still another and related object of the invention is to provide automatic brake mechanism operated conjunctively with the electric controls for the gear shift drive motor such that the moving parts of the gear shift mechanism are automatically braked against overrunning by mechanical inertia when such motor is deenergized by operation of the limit switch mechanism.

In accordance with the invention it is merely necessary to move the remote control master switch into the forward, neutral or reverse gear position of such switch and the automatically controlled gear shift mechanism quickly accomplishes a corresponding setting of the gear shift actuating lever. Such automatic control system, coacting with the master control switch, comprises a follow-up arrangement including a special limit switch mechanism connected in the energizing circuit of the electric motor or equivalent means operating the gear shift. Such limit switch mechanism may have motor-forward and motor-reverse energizing contact plates insulated from each other and slidably engaged by separate contact brushes such that the brushes traverse the plates during movement of the gear shift mechanism. Such plates are provided with generally aligned offset portions engaged successively by a third or neutral contact brush during progressive movement of the gear shift control mechanism between the extreme forward and reverse positions. A neutral zone between the offset portions of such contact plates is provided in which the neutral contact brush is insulated from both plates, engaging neither. When that neutral zone is reached the electric motor is deenergized, whereas it is similarly deenergized when the forward and reverse contact brushes pass beyond the ends of their respective contact plates and out of engagement therewith. Such disengagement of one such brush from its plate occurs in one direction of movement of the brushes relative to the plates, and the other brush from its plate in the opposite direction of such movement, to deenergize the drive motor at the desired opposite limit positions of travel of the gear shift mechanism.

In accordance with a further feature of the control system the moving parts of the gear shift control mechanism are automatically braked to prevent overrun of an attained position upon deenergization of the drive motor, this being accomplished by the incorporation of a brake control solenoid in series in the motor energizing circuit. Such solenoid is automatically energized to release the brake whenever the motor is energized to change the position of the gear shift lever, whereas it is automatically deenergized to permit reapplication of the brake by a spring whenever such energizing circuit is interrupted.

These and other features, objects and advantages of the invention, including certain details of construction of its preferred form, will now become more fully evident from the following description.

The single figure of the drawing is a schematic diagram of the control system applied to the gear shift lever of a boat engine or the like.

In the boat engine transmission housing 10 the gear shift control shaft 12 is journaled for rotation by the gear shift lever 14 mounted thereon. In the case selected for illustration the vertical position of this lever corresponds to the transmission neutral position of the gear shift mechanism. In the forward drive position such lever is inclined upward and to the right from shaft 12 and in the reverse drive position such lever inclined upward and to the left.

Rocking of the lever 14 between any two of these three positions is effected by mechanism including reversible electric drive motor 16, actuating screw 18 driven by such motor through the reduction gearing unit 20, and traveling nut unit 22 cooperating with the actuating screw and having a rigid tubular end extension 24 pivotally connected to the upper end of the gear shift lever 14 by a pivot pin 26, as shown. This pivotal connection to the lever prevents rotation of the traveling nut assembly 22, 24 about its own axis during rotation of the actuating screw 18. The latter projects through the nut unit 22 and some distance into the interior of the tubular extension 24. The reduction gearing unit 20 is supported pivotally from a stationary bracket 28 by a pivot pin 30, as shown, in order to permit slight vertical displacement of the actuating screw 18 and reciprocative nut assembly 22, 24 in effecting rocking of the shifting lever 14. Preferably motor 16, the brake and the limit switch mechanism to be described are carried by reduction gearing unit 20, such as being bolted to brackets mounted on such unit as shown, in order to permit the motor, brake and switch mechanism to rock with the reduction gearing unit about its pivot 30. Other drive coupling arrangements may be used to shift lever 14 instead of the screw mechanism, if desired, such as an electrically controlled piston and cylinder arrangement, but the screw drive is preferred.

The traveling nut unit 22 cooperating with the actuating screw 18 is preferably of the type disclosed in my Patent No. 2,298,011, issued October 6, 1942, employing antifriction ball bearing elements between nut and screw thread surfaces, and a ball return tube 32 permitting recirculation of the balls in endless fashion as explained in said patent. Such an arrangement presents extremely low frictional resistance to relative rotation between the traveling nut unit and actuating screw under heavy thrust loads, hence permits a relatively small electric motor and reduction gearing unit to be employed for driving the gear shift mechanism.

In accordance with the invention a suitable three-position switch 34 having three stationary contacts 34R, 34N and 34F may be installed at the pilot's bridge or other suitable remote control location in the boat for selectively operating the automatic gear shift control system. The entire more bulky remainder of the system, except for electric conductors connecting such switch in the control circuit, may be installed directly in the engine hold, for example.

Electric power for operating the reversible motor 16 is derived from a battery 36 or other suitable power source. The negative terminal of this battery is grounded, whereas its positive terminal is connected to the lower terminal of a solenoid 40 having an upper terminal 42 connected to the arm of switch 34 engageable selectively with contacts 34R, 34N and 34F. The solenoid 40 is therefore energized in each of the three positions of switch 34, assuming a circuit path to ground is completed from the selected switch contact 34R, 34N or 34F, as will be explained. The solenoid has a movable armature rod 40a connected to one end of a lever 44 pivoted at 46. The other end of such lever is connected to a suitable brake 48, illustrated as of the band type, which, under force of spring 50, is normally applied to hold shaft 16' of motor 16 against rotation in either direction. The effect of energizing the solenoid is to raise the outer end of lever 44, which releases the brake and thereby permits free rotation of the motor shaft.

A circuit through the solenoid 40 is completed to ground at 52 through either the forward or reverse field windings of reversible electric motor 16, the terminals designated F and R and bearing reference numerals 54 and 45 representing the terminals of such forward and reverse windings, respectively. These terminals are electrically connected to the elongated limit switch contact plates 58 and 60, respectively, insulated from each other and mounted alongside each other in parallel relationship on the plate 62 carried by the gear casing 20. The contact plate 58 has an offset portion 58' projecting toward the plate 60, and this latter plate has a similar offset portion 60' projecting toward the plate 58, such portions being generally aligned lengthwise of the plates.

The contact plates 58 and 60 are of a suitable conductive material such as copper, brass or aluminum, for example, and lie in a plane which is parallel to the plane of swing of lever 14 and reciprocation of the shiftable nut assembly 22, 24. In this plane the lengths of the strips are parallel to the path of travel of the nut assembly. An upright arm 64, mounted upon the nut extension 24 for reciprocation therewith, carries three contact brushes adapted to move lengthwise of the contact plates 58 and 60 during reciprocation of the arm. These contact brushes are insulated from each other and include, respectively, the three contact brush terminals 66, 68 and 70. Brush 66 is located along arm 64 to engage only plate 58, brush 70 is located on such arm to engage plate 60, and brush 68 is located along the arm to engage alternatively the offset portion 58' of plate 58 or the offset portion 60' of plate 60. One extreme control or circuit-breaking position of arm 64 is established by brush 66 beyond the right end of plate 58, an intermediate control or circuit-breaking position by brush 68 disposed between plate sections 58' and 60', and an opposite extreme control or circuit-breaking position by brush 70 beyond the left end of plate 60. The plates 58 and 60 are of appreciable width transverse to the direction of reciprocation of the arm 64, or may be suitably shaped, so that the brushes remain in contact with the proper plate portions despite the slight vertical displacement of the brushes caused by arcuate travel of the pin 26 on the lever 14. Alternatively the plates 58 and 60 may be made of arcuate shape corresponding to the arcs traversed by the respective brushes.

The terminal of brush 66 is connected electrically to the master control switch contact 34F and is thereby included in the motor energizing circuit which causes the gear shift mechanism to move toward forward gear position. The terminal of brush 68 is similarly connected to the master control switch contact 34N and is thereby included in the motor energizing circuit which causes the gear shift mechanism to move in either direction toward neutral position of lever 14. The terminal of brush 70 is similarly connected to the master control switch contact 34R and is thereby included in the motor energizing circuit which causes the gear shift mechanism to move toward the reversing position of lever 14.

Contact brush 66 remains on the main portion of contact plate 58 in all positions of travel of the arm 64 except in the extreme right position of such arm, corresponding to the forward drive position of the lever 14, when such brush moves off the right end of such contact plate. When the master control switch 34 is positioned to engage switch contact 34F a motor energizing circuit is completed through the forward drive winding of the motor and thereby causes the traveling nut and gear shift lever to advance to the right in the figure. This movement continues until contact brush 66 moves past the right end of contact plate 58 and interrupts the energizing circuit. At that time solenoid 40 is also deenergized and the brake 48 automatically reapplied to prevent overrun of the gear shift lever 14 past the forward drive position.

Contact brush 70 bears a relationship to the contact plate 60 similar to that between the plate 58 and brush 66 as mentioned above. A motor energizing circuit is completed through the reverse drive winding of the motor 16 by positioning the master control switch 34 to engage contact 34R when brush 70 engages the plate 60. This causes the gear shift mechanism to advance toward the left in the figure and rock the lever 14 toward reversing position. Such brush moves off the left end of the contact plate 60 to open the reverse drive circuit at the desired point corresponding to the reversing position of lever 14. Again the solenoid 40, energized during operation of the motor 16 to permit such reversing movement of the lever 14, is deenergized and the brake 48 thereby automatically reapplied to prevent overrun of the lever 14 past reversing position.

Contact brush 68 is in registry with gap 72 between the inner end edges of the auxiliary or offset portions 58' and 60' of the contact plates when arm 64 is in the position corresponding to the neutral position of the shifting lever 14. If this contact brush 68 is thus positioned, as long as the master control switch 34 is in engagement with the neutral contact 34N there is no change in the condition of the motor energizing circuit and the shifting mechanism remains stationary in neutral position. However, if the control switch is moved to neutral position 34N from its forward position 34F, the gear shift mechanism being in the right or forward drive position, a motor energizing circuit will be completed through solenoid 40, contact 34N, terminal 68, plate 60, the motor reverse winding, to ground at 52, causing the lever 14 and arm 64 to move to the left or toward neutral position. When the neutral position is reached the neutral brush overlies the insulating area 72 and this circuit is deenergized, whereupon the brake 48 is automatically applied to stop the gear shift mechanism.

If, on the other hand, the lever 14 and arm 64 are displaced to the left of neutral or at the reverse gear position, when switch 34 is moved to engage contact 34N the alternate motor energizing circuit is formed through the solenoid 40, contact 34N, terminal 68 and plate 58, causing the gear shift mechanism to advance to the right toward neutral position. The motor energizing circuit is interrupted when the neutral brush reaches the insulating area 72 as before.

It is evident, therefore, that the follow-up action of limit switch mechanism comprising the contact plates 58 and 60 and contact brush arm 64 is automatic in causing the gear shift lever 14 to assume any one of the three alternative positions, following positioning of the master control switch 34 to engage one of the three switch contacts 34R, 34N, 34F, as desired. Furthermore, the provision of solenoid 40 acting in conjunction with the brake 48 provides a simple automatic means of preventing overrun of the gear shift mechanism past any of the selected control positions, and thereby permits use of rapid-acting, remote-controlled, power shifting mechanism without difficulty of overrun by mechanical inertia, and without the need of any mechanical stops to be engaged by the lever 14 or associated actuating members.

I claim as my invention:

1. Switching mechanism comprising a set of three contact members, a separate set of two contact members cooperating therewith, one of said sets of contact members being stationary, and means operable to move the other set of contact members relative to said stationary set, each of two of said contact members of the set of three engaging a different one of said contact members of the set of two continuously throughout movement of such movable set of contact members, except in the opposite extreme positions thereof, respectively, and the third contact member of the set of three engaging both contact members of the set of two successively during such movement of such movable set of contact members.

2. Switching mechanism for controlling an electrically operated reversible motive power means having oppositely acting energizable means controlling direction of operation thereof, for moving a movable member into any of three successive positions, and energizable by selector switch means having three selectively engageable contacts corresponding to such three successive positions of such movable member, such mechanism comprising a reciprocative member connected to move with such movable member, and limit switch means including two coacting sets of contact members, one such set comprising three contact members individually connected to a different one of such three selectively engageable selector switch contacts, and the other set comprising two contact members individually connected to a different one of the oppositely acting energizable means, one of said coacting sets being supported for movement conjointly with said reciprocative member and the other of said sets being stationary, one of said two contact members having a main portion continuously engageable by one of said three contact members during relative reciprocative movement thereof in one direction, to energize the energizable means corresponding to such contact member, only until the movable member reaches one extreme position, the other of said two contact members having a main portion similarly engageable by a second of said three contact members during opposite relative reciprocative movement thereof, to energize the opposite energizable means corresponding to such other contact member, only until such movable member reaches its opposite extreme position, and both of said two contact members having auxiliary portions separately engageable in successive order by the third of said three contact members and throughout such relative movement in either direction, respectively, except when an intermediate position of the movable member is reached, to energize one or the other of the energizing means.

3. The switching mechanism defined in claim 2, in which the contact members of the set of three are brush members and the contact members of the set of two are plate members the main portions of which are generally parallel and the auxiliary portions of which are offset from their main portions, such auxiliary portions being generally aligned with each other parallel to the direction of relative reciprocative movement and spaced apart in such direction of alignment at the location of the third contact brush member corresponding to the intermediate one of the three successive positions of the movable member.

4. Switching mechanism comprising a set of two elongated conductors disposed alongside and generally parallel to each other but insulated from each other, and a set of three brush conductors including two brush conductors each respectively engageable with only one of said elongated conductors, and the third brush conductor being alternatively engageable with each of said elongated conductors, and means operable to effect relative movement between said sets of conductors lengthwise of said elongated conductors to move out of engagement any one of said brush conductors and an elongated conductor engaged thereby.

References Cited in the file of this patent

UNITED STATES PATENTS

| Number | Name | Date |
|---|---|---|
| 1,821,514 | Hintz | Sept. 1, 1931 |
| 2,376,299 | Wendelburg et al. | May 15, 1945 |
| 2,423,727 | Rafter | July 8, 1947 |
| 2,451,989 | Smith | Oct. 19, 1948 |
| 2,499,166 | Russell | Feb. 28, 1950 |